May 8, 1945.　　T. VAN TUYL ET AL　　2,375,507
CLAMP
Original Filed Oct. 2, 1939
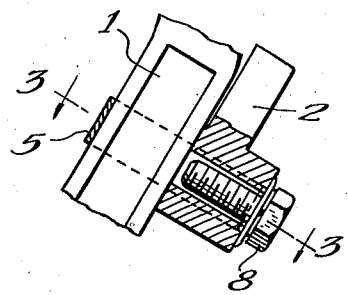
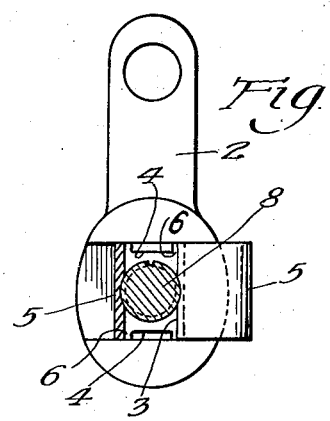
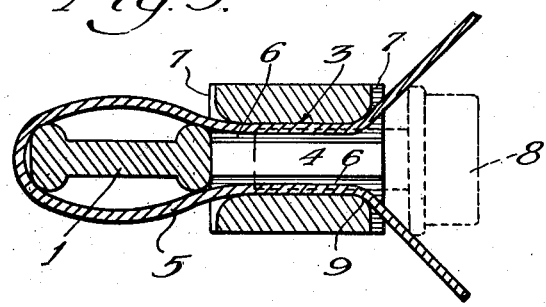
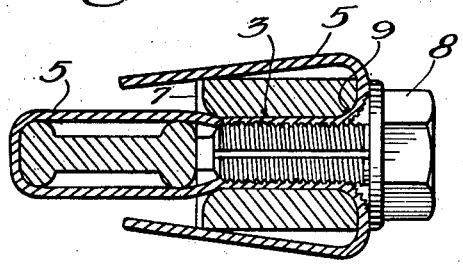
Inventors:
Thomas Van Tuyl &
Charles B. Hale,
By: Wm. F. Freudenreich,
Attorney.

Patented May 8, 1945

2,375,507

UNITED STATES PATENT OFFICE 2,375,507

CLAMP

Thomas Van Tuyl and Charles B. Hale,
Chicago, Ill.

Original application October 2, 1939, Serial No. 297,534. Divided and this application July 1, 1943, Serial No. 493,068

8 Claims. (Cl. 24—243)

The present invention is a division of our prior application entitled Vehicle brake signals, filed October 2, 1939, Serial Number 297,534, which has matured into Patent No. 2,326,808, granted August 17, 1943.

Our invention relates to means for clamping a bracket or other thing to a post, bar or the like and has for its object to produce a simple and novel construction that will make it possible easily and securely to fasten a member to any support about which a light metal strap may be looped.

The various features of novelty whereby our invention is characterized will hereinafter be pointed out with particularity in the claims; but, for a full understanding of the invention and of its objects and advantages, reference may be had to the following detailed description taken in connection with the accompanying drawing, wherein:

Figure 1 is a view, partly in side elevation and partly in section, illustrating one of our improved devices applied to a bar-like piece which may be a fragment of a vehicle brake pedal; Fig. 2 is a view, partly in front elevation and partly in section, of the assembly shown in Fig. 1, but on a larger scale; Fig. 3 is a section on line 3—3 of Fig. 1, on the same scale as Fig. 2, illustrating the manner of applying the clamp; and Fig. 4 is a view similar to Fig. 3, showing the completed assembly appearing in Fig. 1.

Referring to the drawing, I represents a bar, post or the like, and 2 is a bracket which is to be fastened to the same. The bracket has a large hole extending through the same from front to rear. This hole is bounded at the sides by two flat, parallel walls or faces 3. The faces at the top and bottom of the hole may be of any shape, as long as they provide clearance for the screw by which the bracket is to be secured; these faces, indicated at 4, being shown as being flat and parallel to each other.

Cooperating with the bracket is a metal strap, 5, long enough to be looped around the member I and have its ends carried through the hole in the bracket. Grooves 6 are cut in the top and bottom walls bounding the hole in the bracket, beside the side faces 3. The strap is wide enough to extend into these grooves, thereby causing the legs thereof to be held apart when entered in the hole. Wide shallow grooves or depressions 7 are formed in the front and rear faces of the bracket, beside the hole, for the reception of the protruding ends of the strap when they are bent laterally on the side of the bracket which is selected for the front side.

After the strap has been passed around the member I and the ends brought forward through the hole in the bracket, as shown in Fig. 3, a thread-cutting screw 8 is partially entered in the hole from the front, between the strap ends. The vertical corners at the ends of the hole are rounded off, as indicated at 9, to facilitate this operation. The external diameter of the screw is less than the distance between the top and bottom faces 4 but greater than the distance between the strap ends when the latter lie flat against the side faces 3. Upon turning the screw, it cuts a thread in each strap end and gradually draws the strap tight about the member I, by reason of the fact that the two strap ends are drawn forwardly by the screw as long as there is any slack to be taken up. Because of the presence of the shallow grooves or depressions 7 in the front face of the bracket, their depth being a little greater than the thickness of the strap, the head of the screw does not bind on the protruding strap ends; but simply serves as a guide that permits the strap ends to creep laterally and rearwardly until the condition illustrated in Fig. 4 results.

It will thus be seen that by means of our invention, any member, provided with a hole of the proper size and shape, may be fixed to any second member without employing anything more than a simple strap and a thread-cutting screw, provided that a strap can be looped around the second member or a part thereof.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. A device of the character described, comprising a member having a hole through the same, a metal strap formed into an open loop and having its spaced ends extending through said hole, and a screw of the thread-forming type inserted in said hole between said strap ends and fashion cooperating screw threads on the latter.

2. A device of the character described, comprising a member having a hole through the same, a metal strap formed into an open loop and having its spaced ends extending through said hole, a headed screw of the thread-forming type inserted in said hole between said strap ends and fashion cooperating screw threads on the latter, and the face of said member at which the strap ends emerge being recessed to a depth somewhat greater than the thickness of the strap on opposite sides of the hole.

3. A device of the character described comprising a member having a hole extending through the same and provided with opposed parallel surfaces extending lengthwise of the hole at the sides of the latter, a metal strap formed into a loop that is open and has its spaced ends extending through the hole in contact with said surfaces, and a screw of the thread-forming type somewhat larger in diameter than the distance between those portions of the strap ends in contact with said surfaces in said hole between the strap ends.

4. A device of the character described, comprising a member having a hole extending through the same and provided with opposed flat sides, a metal strap formed into an open loop and having its spaced ends extending through said hole in contact with said sides, and a screw of the thread-forming type somewhat larger in diameter than the distance between those portions of the strap ends in contact with said sides inserted in said hole between the strap ends.

5. A device of the character described, comprising a member having a hole extending therethrough and provided with opposed parallel, flat faces at the sides, a metal strap formed into an open loop having its spaced ends extending through said hole in contact with said flat surfaces, said flat surfaces terminating in outwardly flaring surfaces at the end where the strap ends emerge, and a screw of the thread-forming type inserted in said hole between the strap ends and fashion screw threads on the latter.

6. A device of the character described, comprising a member having a hole extending therethrough and provided with opposed, parallel flat sides, a strap formed into an open loop having its spaced ends extending through said hole in contact with said sides, the face of said member at which the strap ends emerge being recessed on opposite sides of the hole to a depth somewhat greater than the thickness of the strap, said flat sides terminating in outwardly curved surfaces that merge into the bottoms of the recesses, and a headed screw of the thread-forming type inserted in said hole between the strap ends and fashion screw threads in the latter.

7. A device of the character described, comprising a member having a hole through the same, two spaced metal strap ends extending into said hole, and a screw of the thread-forming type inserted in said hole between the strap ends and fashion cooperating screw threads on the latter.

8. In combination, a member having a hole therein, two spaced strap ends extending into said hole, and a screw fitting between the strap ends, within said hole, in screwthreaded relation thereto, and clamping the same against said member at opposite sides of the hole.

THOMAS VAN TUYL.
CHARLES B. HALE.